Patented Apr. 3, 1928.

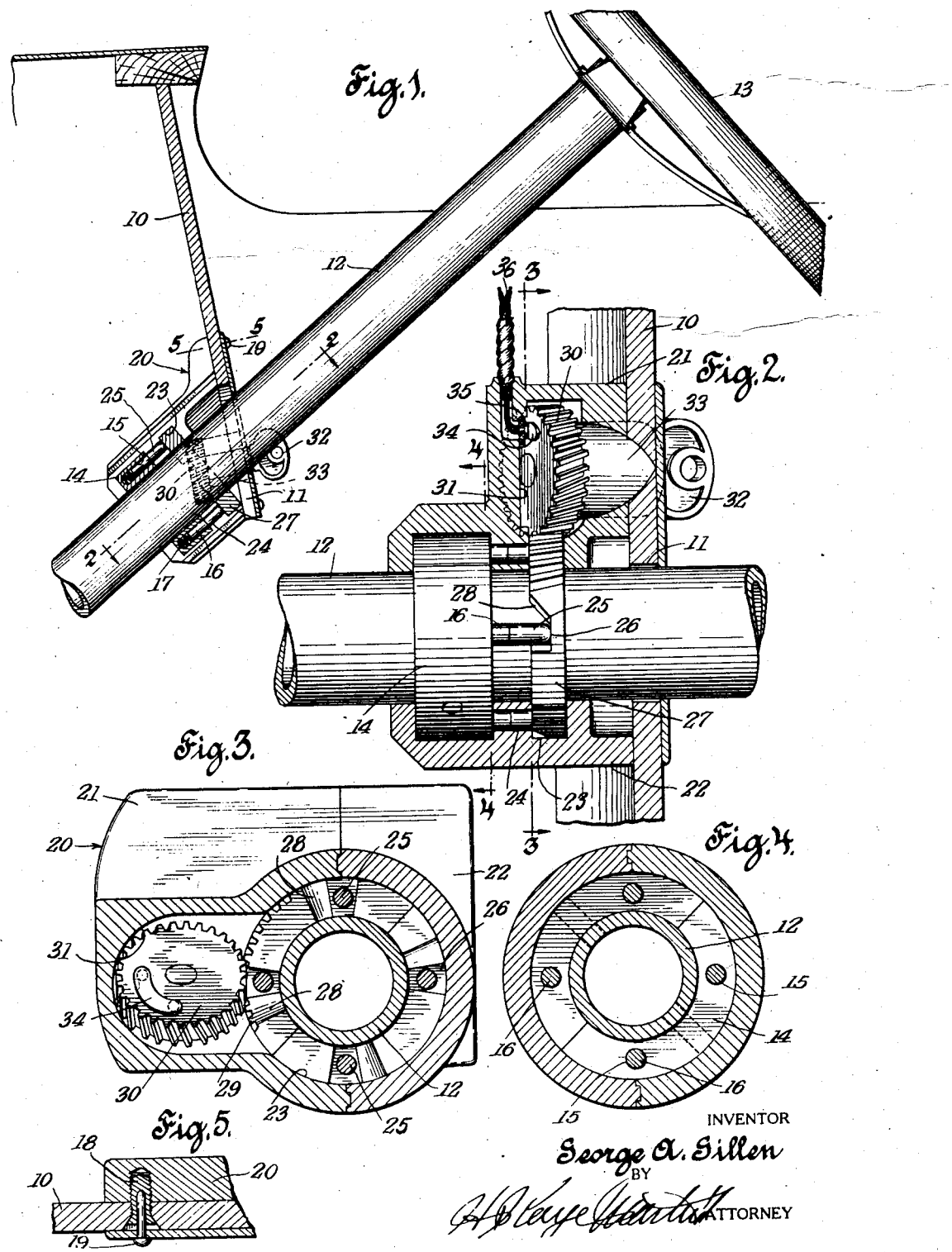

1,664,620

UNITED STATES PATENT OFFICE.

GEORGE A. GILLEN, OF NEW YORK, N. Y., ASSIGNOR TO GILLEN, KIMMEY, BAKER SYNDICATE INC., OF NEW YORK, N. Y.

LOCK FOR MOTOR VEHICLES.

Application filed March 6, 1926. Serial No. 92,978.

This invention relates to new and useful improvements in locks for motor vehicles and its object is to provide a device for locking the steering wheel against movement and simultaneously disconnecting the ignition system so as to render the motor inert.

It has been the custom for many years in the production of motor vehicles to provide an ignition switch by means of which the motor may be rendered useless, and a further development has been the provision of a pin tumbler lock for controlling the switch which in a measure has served the purpose of retarding theft. In view of the recent activities however of unauthorized individuals, such a locking means has been found inadequate, and as a consequence additional locking devices applicable to other vital parts of the vehicle have been developed.

It remains however, for the applicant to provide a combined locking device designed to lock two of the vital elements of the vehicle with a single operation, thereby increasing the theft resisting features twofold so as to make it doubly difficult for an unauthorized person to make way with the vehicle.

As another object, the invention contemplates the provision of an ignition switch in conjunction with a steering wheel lock which is so designed as to prevent the stopping of the motor without placing the auxiliary locking element in theft resisting position.

Referring to the drawings which illustrate what I now consider a preferred form of the invention:

Figure 1 is a side view of a steering post showing the application of my improved lock, the near half of the lock casing being removed.

Figure 2 is a sectional view taken on line 2—2 of Figure 1.

Figure 3 is a sectional view taken on line 3—3 of Figure 2.

Figure 4 is a sectional view taken on line 4—4 of Figure 2, and

Figure 5 is an enlarged fragmentary detail sectional view taken on line 5—5 of Figure 1.

Referring to the drawing in detail, the numeral 10 designates the customary instrument board ordinarily provided on a motor vehicle, which in the present instance is slotted as at 11 to accommodate the steering post 12. The upper end of the steering post is provided with the usual steering wheel 13 as clearly illustrated in Figure 1.

Secured to the steering column 12 at a point below and in the immediate vicinity of the instrument board 10 is a collar 14 which is provided in its upper end with a plurality of spaced bores 15 for the reception of the locking pins 16 which are normally urged outwardly under the influence of compression coil springs 17.

Surrounding the collar and fixed to the instrument board by means of screws 18 and drive pins 19 is a casting or housing 20 which for the purpose of assembly is constructed in two separate sections, 21 and 22.

Formed in the housing 20, is an annular chamber 23 which communicates through bores 24 with the recess in which the collar 14 is rotatably received.

Slidably mounted in the bores 24 are tumbler pins 25, the inner ends of which when the lock is in locked position, align with the pins 16. The outer ends of these pins 25 when the lock is in locked position project into the recesses 26 formed in the cam ring 27 which rides freely in the chamber 23 around the steering column 12. Obviously as the ring 27 is turned, the cam faces 28 formed therein will cause the pins 25 to move through their respective bores 24, thereby forcing the pins 16 inwardly against their springs 17 into such position that the point of separation between the pins 16 and 25 will align with the upper end of the collar 14, thereby permitting the steering post to freely rotate.

In order to control the movements of the cam ring 27, a portion of the periphery thereof is toothed as at 29 to mesh with a pinion 30, mounted to rotate within a chamber 31 formed in the section 21 of the casting.

Rotation of this pinion is controlled by means of a key 32 of a pin tumbler lock cylinder 33 which is mounted in the casting as will be clearly seen upon reference to Figures 1 and 2.

In order that the ignition may be controlled, with the placing of the lock in theft resisting position, a contact element 34 is mounted on the exposed rear face of the pinion 30 and is adapted to be moved into bridging engagement with a pair of contacts 35 carried on the back wall of the chamber 31 and connected by means of wires 36 to the ignition system of the vehicle.

In use it will be seen that upon rotation of the pinion 30 by manipulation of the key 32, the contact 35 will act to either make or break the ignition circuit and simultaneously the ring 27 will be rotated to move the pin 25 so as to place the locking pins 16 in either projected or retracted position depending upon the original position of the lock.

In accordance with the provisions of the patent statutes, I have herein described the principle of operation of my invention, together with what I now consider to represent the best embodiment thereof, but I desire to have it understood that the apparatus shown is only illustrative and that the invention can be carried out by other means. Also, while it is designed to use the various features and elements in the combinations described, some of these may be altered, and others omitted without interfering with the more general results and effects outlined, and the invention extends to such use.

What I claim is:

1. A motor vehicle steering post lock comprising a collar adapted to be fixed to the steering post, a second collar disposed adjacent the first collar and adapted to be rotatably mounted on the steering post, a casing fixed to the motor vehicle and surrounding said collars, pin tumblers carried by the casing for interlocking engagement with said fixed collar, said rotatable collar having cam faces thereon for engaging said pin tumblers, and key controlled means for turning said rotatable collar.

2. A motor vehicle steering post lock comprising a pair of collars adapted to be placed about a steering post, means for securing one of said collars to the post, a fixed casing enclosing the collars, a plurality of pin tumblers mounted in the casing in parallel relation to the steering post and in interlocking relation to the collar fixed to the steering post, and a pin tumbler cylinder lock mounted in the casing and connected to the other collar for turning the same, said other collar having inclined guiding faces in contact with said pin tumblers for shifting the same when said collar is rotated.

In witness whereof, I hereunto subscribe my name this 8th day of February, A. D., 1926.

GEORGE A. GILLEN.